July 2, 1963 J. H. PETERMANN ETAL 3,096,521

MAGNETIC DATA RECORDING APPARATUS

Filed March 6, 1959 2 Sheets-Sheet 1

INVENTORS:

Johannes Hugo Petermann & Nora Anne Petermann

By [signature] Patent Agent

MAGNETIC DATA RECORDING APPARATUS
Filed March 6, 1959 2 Sheets-Sheet 2
FIG. 3
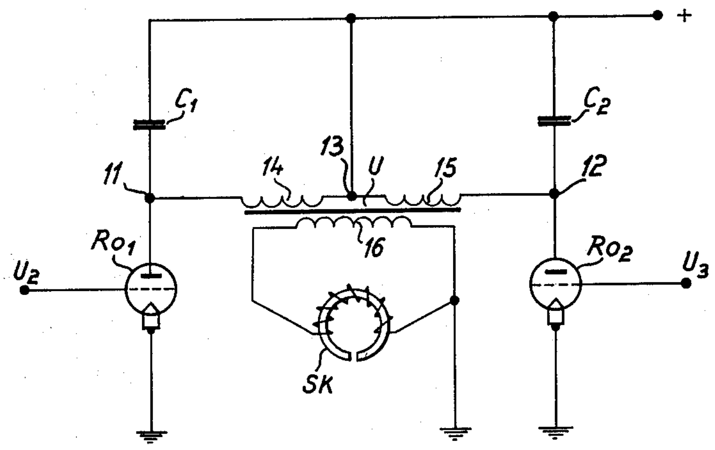
FIG. 4a
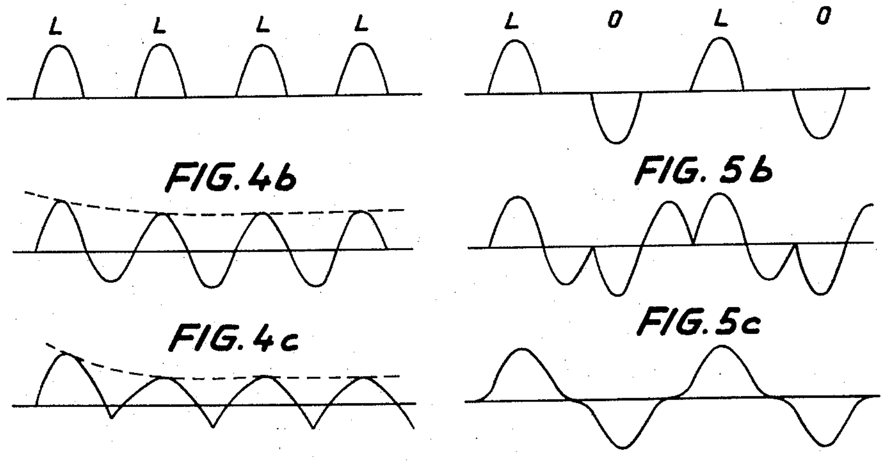
FIG. 5a, FIG. 4b, FIG. 5b, FIG. 4c, FIG. 5c
INVENTORS:
Johannes Hugo Petermann & Nora Anne Petermann
By [signature]
Patent Agent

United States Patent Office 3,096,521

Patented July 2, 1963

3,096,521

MAGNETIC DATA RECORDING APPARATUS

Johannes Hugo Petermann and Nora Anne Petermann, Wilhelmshaven, Germany, assignors to Olympia Werke AG., Wilhelmshaven, Germany Filed Mar. 6, 1959, Ser. No. 797,787
Claims priority, application Germany Mar. 13, 1958
8 Claims. (Cl. 346—74)

Figure 1:
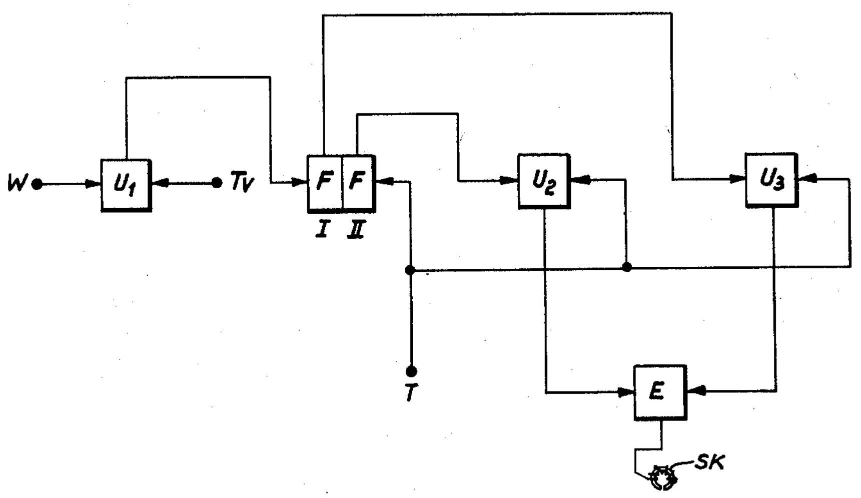
Figures 2A, 2B, 2C, 2D, 2E, 2F, 2G, 2H:
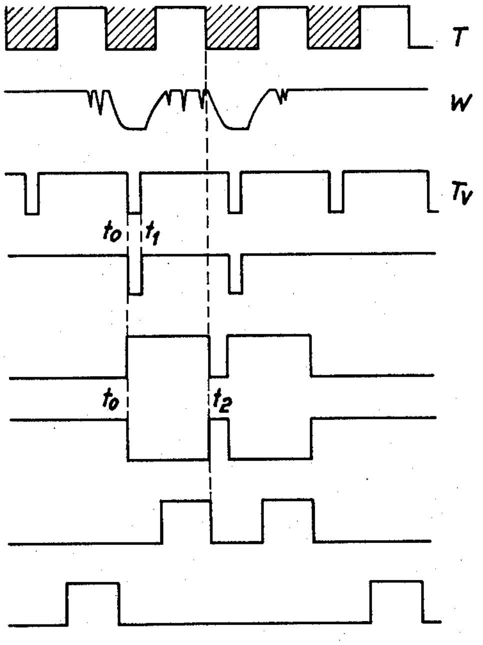

The present invention relates to a magnetic data recording device employing cylindrical or tape storage means for use in apparatus in which data are processed, particularly, in computing machines. The invention permits the recording of pulses on a magnetic carrier layer moving at a synchronous rate.

When using the "return-to-zero" system, the binary numbers "O" and "L" are represented as separate magnetizations on the storage carrier in one or the other polarity direction. While in a "non-return-to-zero" system the elementary mark must theoretically be rectangular, in case of the "return-to-zero" system, the magnetizing action should go back to zero after each digit. Consequently, in the latter system, in the ideal case, the shape of the pulse will be an equilateral triangle, the apex of which represents "L" in the positive direction and represents "O" in the negative direction. Thus, even during such a time interval as data pulses are not received, i.e., when zeros are to be recorded, triangular pulses have to be generated to cause negative marks.

It is an important feature of the device according to the invention that the operation thereof be made independent to a great extent of the shape of the pulse to be recorded.

Substantial advantages in pulse recording are obtained with the apparatus according to the invention without requiring the complex circuitry conventional with this kind of recording systems. Primarily in view of the less expensive switching means, the "return-to-zero" system results in a genuine simplification in recording. It is a great advantage of the new system that pulses can deviate from the rectangular shape to a great extent. Disturbances which occur at the pulse edges are without effect on the recording quality.

It is an object of the present invention to provide an apparatus for magnetic recording of pulses according to the "return-to-zero" system, wherein the recording amplifier receives the pulses to be recorded from two "and" circuits, and wherein a first input of the apparatus is directly connected to the synchronizing means, and further inputs are connected by switching means in such a manner that one of the "and" circuits coincides only in case of an input pulse present, while the other "and" circuit transmits a pulse only in case of a missing input pulse.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed description.

In the drawings:

FIGURE 1 illustrates a basic circuit diagram of the device according to the invention;

FIGURES 2*a* through 2*h* show the curve of the voltages appearing at different points of the circuit shown in FIGURE 1;

FIGURE 3 is a circuit diagram of a recording amplifier as used in FIGURE 1;

FIGURES 4*a* through 4*c* illustrate the curves of the recording current for the example LLLL;

FIGURES 5*a* through 5*c* illustrate the curves for the recording current for the example LOLO.

In addition to synchronizing waves T with a pulse ratio 1:1 (FIGURE 2*a*), the circuit requires an auxiliary wave T*v* (FIGURE 2*c*) wherein the pulse ratio deviates from unity.

The auxiliary wave T*v* and recording pulses W (FIGURE 2*b*) are transmitted to an "and" circuit $U_1$ (shown in FIGURE 1). If an auxiliary wave T*v* and a pulse W coincide at the inputs, the "and" circuit $U_1$ supplies a pulse during the time interval $t_0$–$t_1$ (see FIGURE 2*d*). A flip-flop switch FF is switched into position II by the output pulses of said "and" circuit $U_1$. This flip-flop switch FF always returns to its starting position I, due to the action of the subsequent downwardly directed flank of the synchronizing wave T. Thus, pulses will appear at the anode of this flip-flop switch, said pulses starting at the time period $t_0$ and lasting until $t_2$ and being of opposite polarity (see FIGURES 2*e* and 2*f*).

The flip-flop pulses are then each fed to a further "and" circuit $U_2$, $U_3$, having other inputs to which the synchronizing wave T is always connected. Consequently, pulses of the duration of the wave T will appear in case of coincidence at the outputs of the "and" circuits, i.e., at the "and" circuit $U_2$ when no input pulse appears, and output pulses will appear at the "and" circuit $U_3$ only in case of the presence of input pulses (see FIGURES 2*h* and 2*g*, respectively).

The output voltages of the "and" circuits $U_2$ and $U_3$ appear subsequently in the recording amplifier E (see FIGURES 1 and 3). This amplifier E, as shown in FIGURE 3, comprises a tube with two separate sections $R_{01}$ and $R_{02}$ which are, respectively, rendered conductive by one output pulse of one "and" circuit $U_2$ or $U_3$.

The anodes of the two sections $R_{01}$ and $R_{02}$ are connected, respectively, to the end terminals 11 and 12 of the primary of a transformer U provided for superior matching of the energy to the recording head SK from these tube sections. The transformer U has a center tap 13 connected to a positive supply voltage and the coil sections 14 and 15, separated at the center tap 13, are shunted by condensers $C_1$ and $C_2$, respectively. Due to the pulses appearing at the tube inputs, one or the other tube will briefly carry current, so that current pulses in opposite directions will be induced in the secondary 16 of the transformer U and will flow through the recording head SK.

The values of the condensers $C_1$ and $C_2$ are suitably selected in such a manner that overshoot of the current occurs. More particularly, each capacitor and the half of the primary across which it is connected form a resonant circuit, so that the particular amplifier circuit to which the resonant circuit is connected will produce substantially sinusoidal oscillations in the resonant circuit. As a result, there will be induced in the secondary of the transformer a voltage or current curve which, with reference to the zero line of the current, is a pseudo wave pattern. FIGURES 4*a* and 5*a* show the theoretical curves of recording currents as applied in the "return-to-zero" system. These examples relate to recording pulses of the sequences LLLL or LOLO. FIGURES 4*b* and 5*b* illustrate the recording current curve of equal sequences, however, under the assumption of overshooting, which occurs when the condensers $C_1$ and $C_2$, shunted across the portions of the primary coil sections 14 and 15 of the transformer U, are suitably selected, as aforementioned. This feature of the present invention is of great advantage, because the current amplitudes remain substantially constant independent of the pulse sequence supplied, while, otherwise, an amplitude width levelling occurs around the zero line, as seen in FIGURES 4*c* and 5c, and the current amplitude may change for amounts or values up to 100% depending upon the signal frequency desired.

Constant amplitudes are desirable primarily because disturbances may occur, due to remaining residual magnetization, etc., if pulses are recorded with different current intensities. Furthermore, it is advantageous to magnetize the zone to the right and left sides adjacent each signal in opposite directions.

We claim:

1. In an arrangement for applying input pulses to a magnetizable record carrier, the combination which comprises: a recording head having a winding past which recording head the record carrier is moved; a transformer having primary and secondary windings, said secondary winding being connected across said winding of said recording head, said primary winding having a center tap and two end terminals thereby to form two primary halves, said center tap being connected to one terminal of the source of electrical energy; two amplifiers each having two output terminals and one control input terminal, one output terminal of each amplifier being connected to the other terminal of the source of electrical energy and the remaining output terminals of said two amplifiers being connected, respectively, to said two end terminals of said primary winding; two capacitors connected across said halves of said primary winding, respectively, for producing a current overshoot beyond the zero line in the particular half of said primary winding which is energized by the corresponding amplifier when there appears at the output terminal of the respective amplifier a substantially rectangular pulse that reaches to the zero line; and means connected to said control input terminals of said amplifiers for applying to said amplifiers the pulses to be applied to the record carrier.

2. The combination defined in claim 1, wherein said amplifiers are constituted by electron tube means.

3. The combination defined in claim 1, wherein said capacitors have such a capacitance that after the application of a substantially rectangular pulse to the control input terminal of the corresponding amplifier, an oscillation is produced in the circuit consisting of such capacitor and the portion of said primary winding pertaining thereto such that there is induced in said secondary winding and in said winding of said recording head an approximately sinusoidal current which oscillates about the zero line, whereby the information is written by said recording head on the magnetizable surface of the record carrier in the form of a pseudo wave pattern.

4. The combination defined in claim 1 wherein said means connected to said control input terminals of said amplifiers comprise: two "and" circuits each having two inputs and an output, said outputs being connected with the control input terminals of said amplifiers, respectively; a flip-flop circuit having two inputs and two outputs, said outputs being connected with said inputs of said "and" circuits, respectively; means for connecting the remaining inputs of said "and" circuits and one of said inputs of said flip-flop circuit with a source of synchronizing pulses; an additional "and" circuit having two inputs and an output, the latter being connected with the remaining input of said flip-flop circuit; means for applying recording pulses to one of said inputs of said additional "and" circuit; and means for applying auxiliary synchronizing pulses to the remaining input of said additional "and" circuit.

5. The combination defined in claim 4, wherein the synchronizing pulses and the auxiliary synchronizing pulses are of different pulse ratios.

6. The combination defined in claim 4, wherein the connection between said output of said additional "and" circuit and said remaining input of said flip-flop circuit is such that when a recording pulse and an auxiliary synchronizing pulse coincide at said additional "and" circuit, said flip-flop circuit is caused to change its position, said flip-flop circuit being reset to its original position by the next synchronizing pulse applied at said one input of said flip-flop circuit.

7. The combination defined in claim 6 wherein said flip-flop circuit is caused to change its position by the leading flank of a pulse delivered by said additional "and" circuit and reset by the trailing flank of the next synchronizing pulse.

8. In an arrangement for operating a magnetic recording head to cause the same to write pulses into a magnetizable record carrier moving past said recording head, which head has associated with it two amplifier circuits, the combination which comprises: first and second "and" circuits each having two inputs and an output, the latter being connected with said amplifier circuits, respectively; a flip-flop circuit having two inputs and two outputs, the latter being connected, respectively, with said inputs of said "and" circuits; means connected to the remaining inputs of said "and" circuits and to one of the inputs of said flip-flop circuit for applying synchronizing pulses thereto; and a third "and" circuit having two inputs and an output, the latter being connected to the remaining input of said flip-flop circuit for applying thereto output pulses of opposite polarity corresponding to O and L coded input pulses pertaining to recording and auxiliary synchronizing pulses applied to said inputs of said third "and" circuit and thereby exciting said first and second "and" circuits, whereby one of said first and second "and" circuits will apply an output pulse to the respective amplifier circuit with which its output is connected when a recording pulse coincides with an auxiliary synchronizing pulse and the other of said first and second "and" circuits will apply an output pulse to the respective amplifier circuit with which its output is connected when a recording pulse does not coincide with an auxiliary synchronizing pulse.

References Cited in the file of this patent

UNITED STATES PATENTS

| | | |
|---|---|---|
| 2,780,670 | Brewster | Feb. 5, 1957 |
| 2,804,605 | De Turk | Aug. 27, 1957 |
| 2,860,193 | Lindsay | Nov. 11, 1958 |
| 2,876,058 | Kerosian et al. | Mar. 3, 1959 |
| 2,887,674 | Greene | May 19, 1959 |
| 2,894,796 | Reynolds | July 14, 1959 |
| 2,903,677 | Curtis | Sept. 8, 1959 |
| 2,923,589 | Curtis | Feb. 2, 1960 |
| 3,009,758 | Marsh | Nov. 21, 1961 |